No. 856,780. PATENTED JUNE 11, 1907.
G. L. HOLLIDAY & I. S. HAWKS.
STONE PICKER.
APPLICATION FILED JULY 17, 1906.
2 SHEETS—SHEET 1.
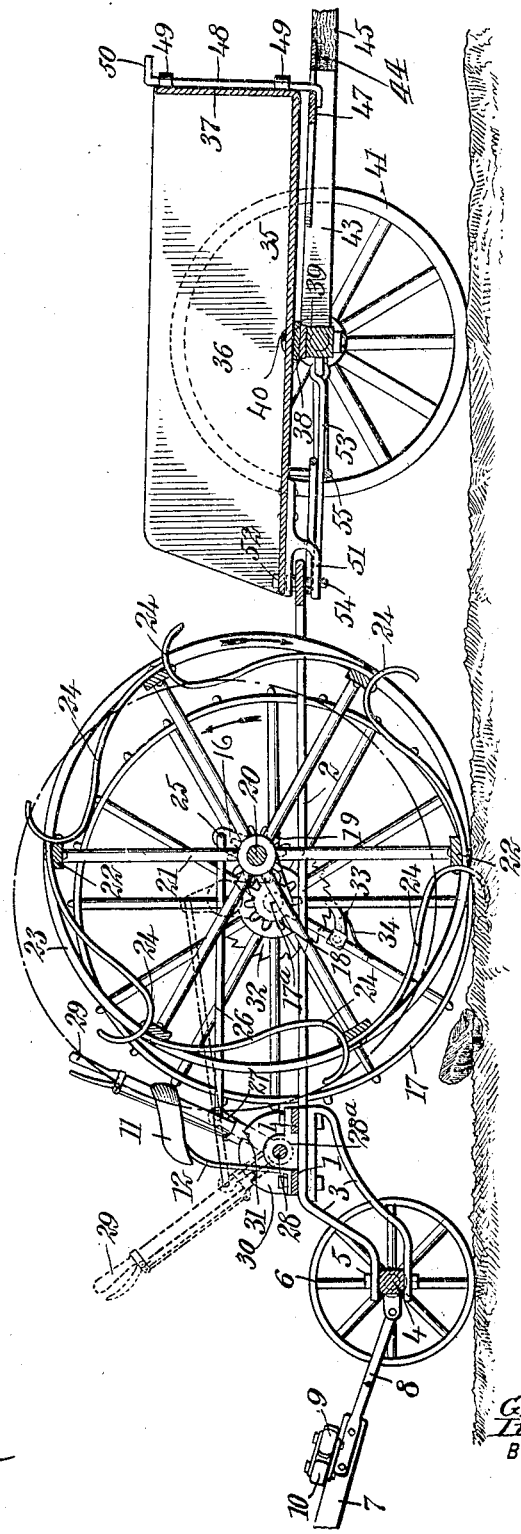
WITNESSES
INVENTORS
Grove L. Holliday
Ira S. Hawks
BY
ATTORNEYS No. 856,780. PATENTED JUNE 11, 1907.
G. L. HOLLIDAY & I. S. HAWKS.
STONE PICKER.
APPLICATION FILED JULY 17, 1906.
2 SHEETS—SHEET 2.
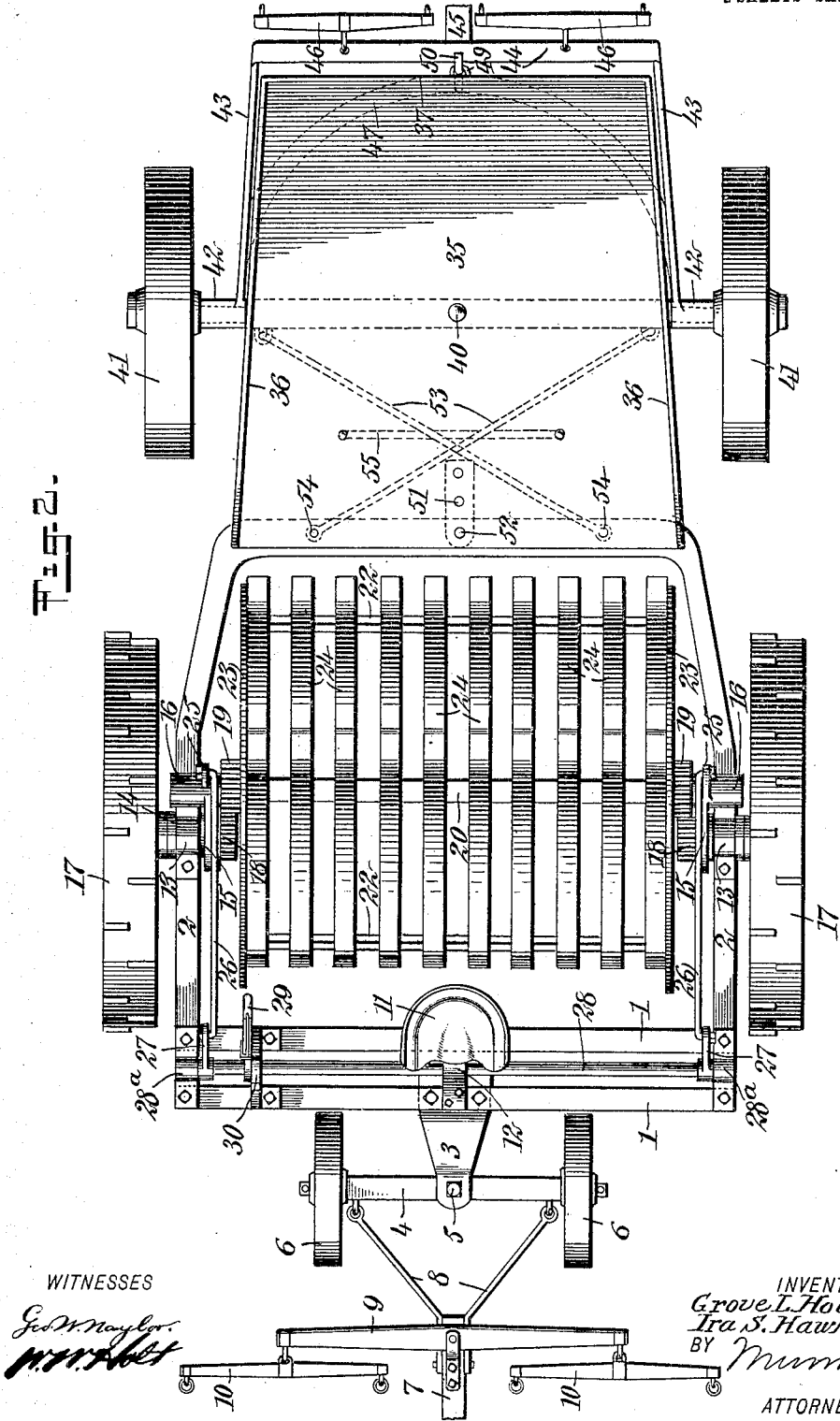
WITNESSES
INVENTORS
Grove L. Holliday
Ira S. Hawks
BY Munn & Co
ATTORNEYS

UNITED STATES PATENT OFFICE.

GROVE L. HOLLIDAY AND IRA S. HAWKS, OF CURTISS, WISCONSIN.

STONE-PICKER.

No. 856,780.   Specification of Letters Patent.   Patented June 11, 1907.

Application filed July 17, 1906. Serial No. 326,577.

*To all whom it may concern:*

Be it known that we, GROVE L. HOLLIDAY and IRA S. HAWKS, both citizens of the United States, and residents of Curtiss, in the county of Clark and State of Wisconsin, have invented a new and Improved Stone-Picker, of which the following is a full, clear, and exact description.

This invention is an improved stone picker designed to remove stones and the like from farm land, with ease and facility.

Among other objects of the invention is to provide a machine of this character adapted to positively remove the stones from the land as the machine is pulled along, and load them into an auxiliary cart coupled to the rear of the machine, and which can be uncoupled when loaded and driven to the desired dumping ground, thereby dispensing with the labor entailed in such machines as dump the stones in piles thereafter to be re-loaded before being carted away.

Reference is to be had to the accompanying drawings forming a part of this specification, in which similar characters of reference indicate corresponding parts in all the figures.

Figure 1 is a side elevation of the stone picker partly in section; and Fig. 2 is a plan view of the same.

The machine is built on a framework comprising two parallel front bars 1 connected at their ends to side bars 2, which latter are made in a single piece by bending it into the form of a U, tapering in width toward its rear end. To the center of the bars 1 is secured a forwardly projecting bracket 3 constructed of bar iron and embracing at its outer end an axle-tree 4, to which it is pivotally connected by a bolt 5. The axle-tree 4 has journaled upon it at its ends, small wheels 6 for supporting the forward end of the machine, said tree being also connected at each end to a tongue 7 through the intermediary of convergent bars 8 rigidly bolted to the tongue at each side, and at rear ends loosely secured to the axle 4. On the top of the tongue is pivotally mounted a double-tree 9 carrying at each end a swingle-tree 10 for hitching the draft animals for pulling the machine about. A seat 11 supported on a spring member 12 secured directly over the bracket 3 is placed at a convenient position for the driver to operate the stone-picking mechanism hereinafter described.

Journaled in boxes 13 secured at about midway of the side bars 2 are collars 14 projecting at each side of the frame and at the inside thereof, carrying arms 15 terminating at their upper ends in outwardly projecting lugs 16. Traction wheels 17 are each provided with a projecting axle 17$^a$ at their centers, said axles passing through the collars 14 in which they are journaled, and have fixed to them at their ends at the inside of the machine frame, pinions 18 in mesh with pinions 19 fixed to axis 20 of a picker journaled in the lugs 16 carried by the aforesaid arm 15. The picker comprises a wheel adjacent to each of the pinions 19, and made up of a number of radiating spokes 21, to the upper ends of which are fixed cross-bars 22 and rings 23 forming the periphery of the wheels and providing them with strength and rigidity. Secured between each adjacent pair of cross-bars 22 by rivets or other suitable means, is a series of rake-teeth 24, shaped after the fashion of a fish-hook and arranged tangentially to the wheels supporting them. This construction forms an open-work picker which will easily pass under stones and carry them upward as the teeth are rotated. At the top of each of the lugs 16 a lug 25 projects, to which is pivotally connected a link 26, connected at its opposite and forward end to an arm 27 fixed to a shaft 28 journaled between the cross bars 1 in suitable journal-boxes 28$^a$ secured to the ends of the frame. A lever 29 is also secured to this shaft and traverses a quadrant 30 spanning the bars 1 and within a convenient distance from the driver's seat 11. Suitable notches are cut in the quadrant 30 which are engaged by a spring-pressed tooth 31 operated at the handle end of the lever in a well known manner.

To each of the axles 17$^a$ is fixed at the outside of their respective wheels, a ratchet wheel 32 engaged by a rearwardly extending pawl 33 pivotally connected to a bracket secured to one of the spokes of the wheel, said pawl being normally pressed into engagement with the ratchet-wheel by a spring 34. This construction admits of the wheels 17 turning freely on their axes when moved in a rearward direction, but enforces said wheels to drive the pinions 18 and therefore the picker mechanism, when the wheels move forward.

It is evident when the hand lever 29 is pushed forward to the dotted position shown in Fig. 1 that it will cause the picker to rock upon the journal boxes 13 as a center, carrying it out of range of the surface of the ground and therefore out of action, which position it is to assume when not in use.

To the rear of the machine frame is connected, when the machine is in operation, a cart 35, said cart being preferably constructed of sheet metal with upwardly extending sides 36 and a front end 37. The bottom of the cart has secured to it, passing transversely across it at substantially its center, a wear plate 38 which rests on an axle-tree 39 pivotally connected to the center of the cart by a bolt 40 passing through the bed. The axle-tree 39 has journaled on it at its extreme outer ends suitable wheels 41 to support the bed of the cart at a slight distance below a horizontal plane passing through the center of the machine. The axle-tree has also journaled on it at the inside of the wheels, collars 42, from which project side bars 43, connected at their outer ends by a crossbar 44, which carries suitable hitching means comprising a tongue 45 and swingle-trees 46. The side bars 43 are also connected by a curved plate 47 passing underneath the front edge of the cart. This plate is designed to be engaged by the hooked end of a rod 48 journaled in guide-ways 49 at the front side of the cart and operable by a handle 50.

When the cart is to be dumped, the handle 50 is turned to disengage the plate 47, permitting the cart to tilt backward on its axle as a pivot while the frame-work thereunder remains stationary. The connection between the cart and the machine is preferably formed by providing the tail end of the cart with a bifurcated coupler 51 into which the rear cross-bar of the machine frame is adapted to be passed and engaged by a pin 52. The cart is additionally secured to the machine by rods 53 crossing each other, secured to the axle 39 near its ends, and at their opposite ends to the rear cross-bar of the machine frame at each side of the coupler, by removable pins 54 passing through them. A rod 55 secured to the bottom of the cart and spaced slightly from it, supports the rods 53 when the cart is uncoupled from the machine. It is evident that the rods 53, when coupled to the machine frame as illustrated, assist materially in guiding the cart as it is hauled about.

In the operation of the machine, the rake teeth gather up stones and the like in their path, and carry them to an elevated position at the top of the machine and precipitate them into the cart 35. When the cart has received a load, it is uncoupled from the machine and driven to the desired dumping ground, thereby dispensing with the labor entailed in re-hauling the stones, as in machines which collect them in piles only.

Although I have described the invention in detail, it is to be understood that the scope thereof is limited by the annexed claims only.

Having thus described my invention I claim as new and desire to secure by Letters Patent:

1. In a machine for picking stones, a frame, wheels journaled thereon, a picking mechanism adapted to be driven by the wheels, comprising side wheels connected by cross-bars, and a series of fish hook shaped teeth fixed between the adjacent crossbars.

2. In a machine for picking stones, a picking mechanism comprising wheels spaced apart rigidly secured together by crossbars, and fish hook shaped teeth tangentially arranged to the wheels and secured to adjacent bars, for the purpose described.

In testimony whereof we have signed our names to this specification in the presence of two subscribing witnesses.

GROVE L. HOLLIDAY.
IRA S. HAWKS.

Witnesses:
JOHN CRANSHAW,
WILLARD HICKOK.